United States Patent [19]

Gloomis

[11] Patent Number: 4,518,130

[45] Date of Patent: May 21, 1985

[54] LAP AND SHOULDER BELT RETRACTOR

[75] Inventor: Lawrence A. Gloomis, Sterling Heights, Mich.

[73] Assignee: General Motors Corporation, Detroit, Mich.

[21] Appl. No.: 592,392

[22] Filed: Mar. 22, 1984

[51] Int. Cl.$^3$ .................. A62B 35/00; B65H 75/48
[52] U.S. Cl. .................. 242/107; 242/107.4 R; 280/807; 280/808
[58] Field of Search .......... 242/107, 107.4 R–107.4 E; 280/803, 806–808; 297/475–480

[56] References Cited

U.S. PATENT DOCUMENTS

| | | | |
|---|---|---|---|
| 2,883,123 | 4/1959 | Finnigan | 242/107.4 R |
| 3,241,883 | 3/1966 | Fontaine | 242/107.4 R X |
| 4,079,964 | 3/1978 | Yamada et al. | 242/107.4 R X |
| 4,147,387 | 4/1979 | Coenan | 242/107 X |
| 4,303,209 | 12/1981 | Stephenson | 242/107.4 A |

Primary Examiner—John M. Jillions
Attorney, Agent, or Firm—Charles E. Leahy

[57] ABSTRACT

A seat belt retractor includes a main spring which urges rotation of a lap belt reel in the direction to wind the lap belt taut about the occupant lower torso. The shoulder belt reel is drive coupled to the lap belt reel for rotation therewith in the belt winding direction by the main spring to also hold the shoulder belt taut against the occupant. The drive coupling mechanism acting between the shoulder belt reel and the lap belt reel includes a lost motion connection and an auxiliary spring of lesser effort than the main spring which cooperate to permit a range of futher unwinding rotation of the shoulder belt relative to the lap belt reel. Thus, while the seat occupant lower torso remains stationary in the seat, the upper torso may lean forward against the lesser effort of the auxiliary spring as necessary to reach vehicle controls.

3 Claims, 7 Drawing Figures

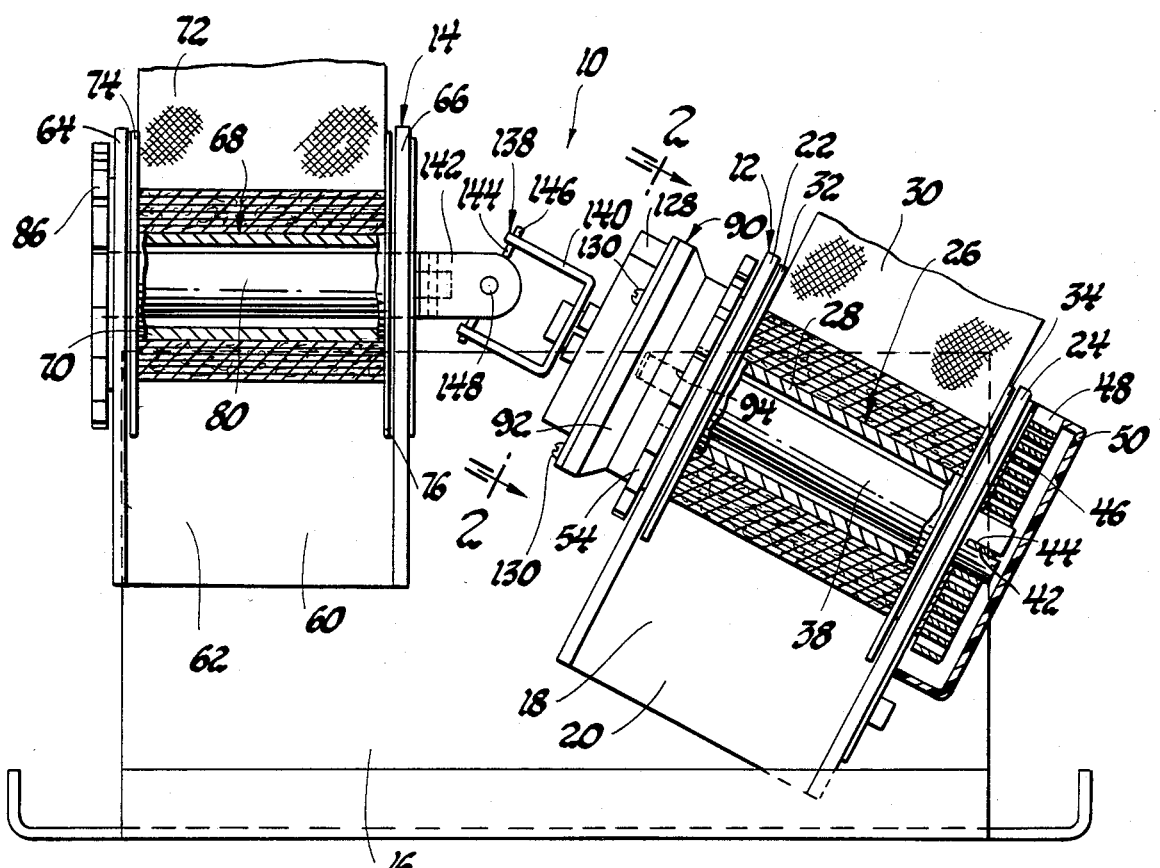
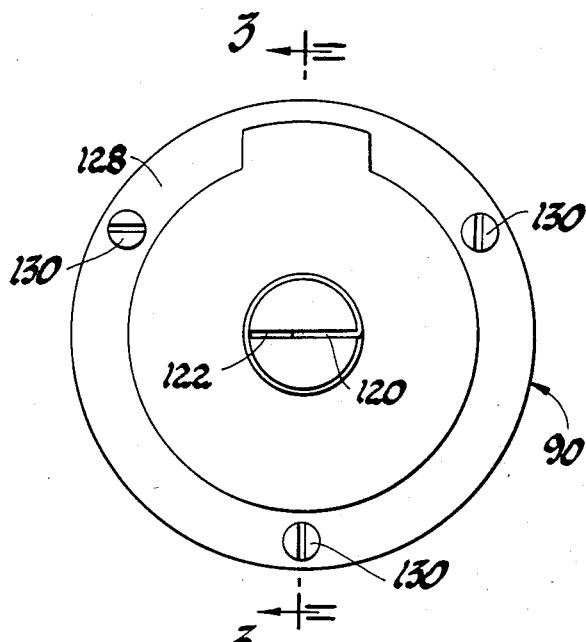
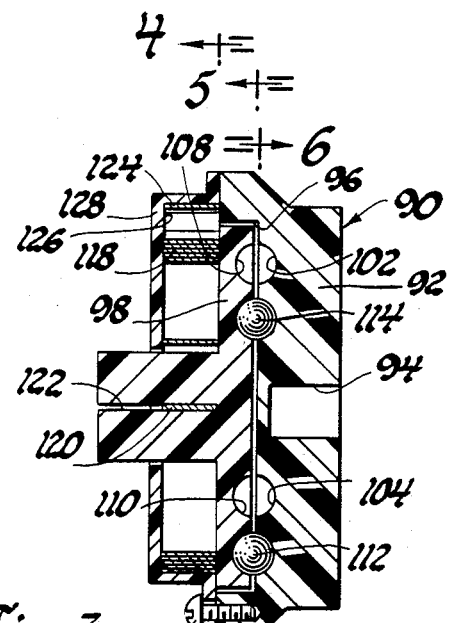

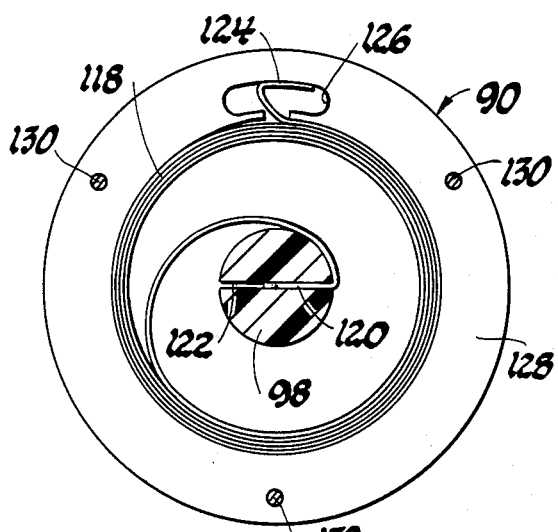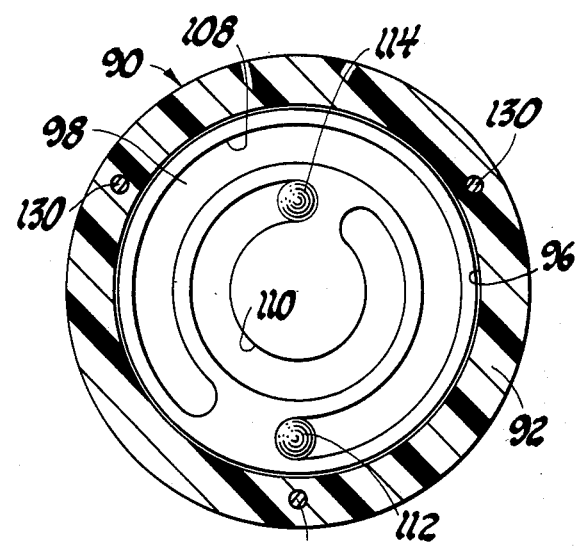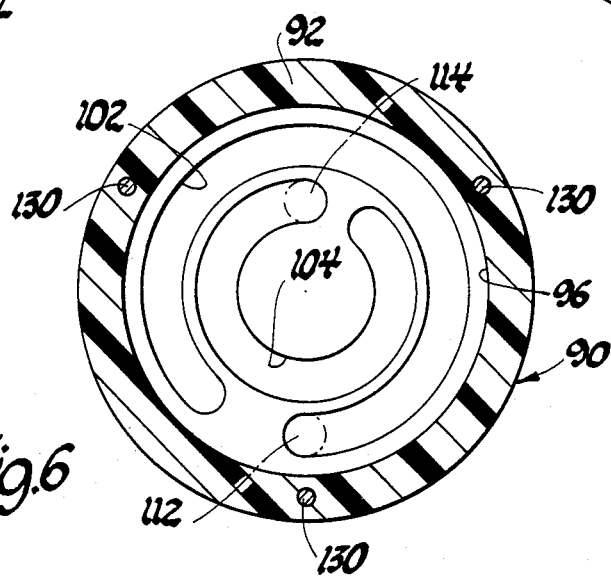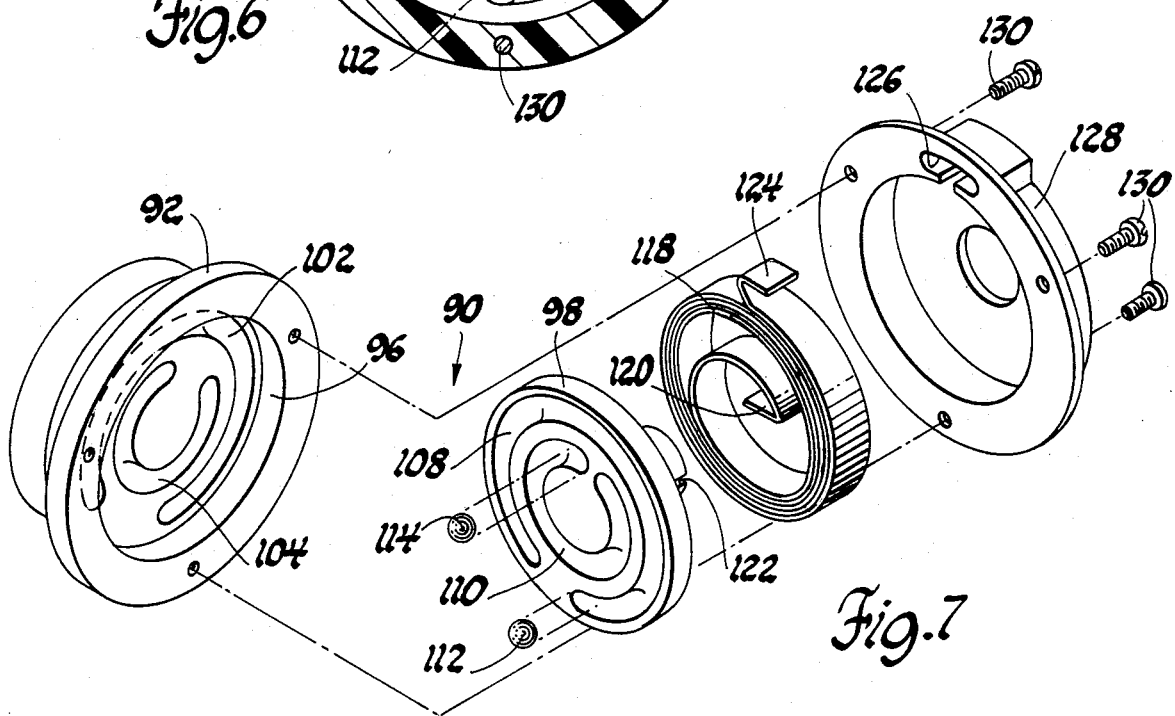

LAP AND SHOULDER BELT RETRACTOR

The invention relates to a retractor having a main spring urging windup of both the lap and shoulder belts and an auxiliary spring which is lost motion coupled between the shoulder belt reel and lap belt reel to permit shoulder belt unwinding while the lap belt length remains the same.

BACKGROUND OF THE INVENTION

Occupant restraint systems for motor vehicles typically include a lap belt retractor for winding a lap belt taut about the occupant lower torso and a shoulder belt retractor for winding a diagonally disposed shoulder belt taut about the occupant upper torso. Such retractors typically include a reel having the belt attached thereto and a spiral or clock spring which rotates the reel in the belt winding direction.

It is characteristic of the aforedescribed conventional seat belt retractor that when the belt is fully unwound and buckled in a restraining position about a seated occupant, the spring is fully wound up and provides its highest level of winding bias upon the reel. This relatively high winding bias on the seat belt can be annoying, particularly in the shoulder belt retractor since the occupant must lean forward against the tension of the belt in order to reach the vehicle controls.

Accordingly prior patents such as Knierieman's U.S. Pat. No. 3,984,063, issued Oct. 5, 1976, and others recognize that the use of a primary spring and auxiliary spring can be employed to provide two different levels of winding tension on the belt, with the lower winding effort being applied to the belt when the belt is disposed in its restraining position about the occupant.

Still other prior patents, such as Magyar's U.S. Pat. No. 4,023,746, issued May 17, 1977, have proposed shoulder belt retractors in which a pawl is engageable with ratchet teeth carried on the reel to lock the reel against belt winding rotation so that the shoulder belt may be held at a slackened length about the occupant to further enhance occupant comfort.

SUMMARY OF THE INVENTION

The present invention provides a new and improved retractor in which a main spring urges rotation of the lap belt reel in the direction to wind the lap belt taut about the occupant lower torso and the shoulder belt reel is drive coupled to the lap belt reel for rotation therewith in the belt winding direction by the main spring so that the shoulder belt is also wound taut against the occupant. The drive coupling mechanism acting between the shoulder belt reel and the lap belt reel includes a lost motion connection and an auxiliary spring which cooperate to permit a range of unwinding rotation of the shoulder belt reel relative to the lap belt reel against the lesser winding bias of the auxiliary spring. Thus, while the occupant lower torso remains stationary in the seat, the occupant upper torso may lean forward against the lesser effort of the auxiliary spring as necessary to reach the vehicle controls.

Accordingly, the object, feature and advantage of the present invention resides in the provision of a drive coupling between a shoulder belt reel and a lap belt reel so that the main spring winding the lap belt reel also winds the shoulder belt reel and yet the shoulder belt reel is capable of shoulder belt unwinding rotation to enable forward leaning movement of the occupant upper torso while the lap belt remains taut about the stationary lower torso of the seated occupant.

A further object, feature and advantage of the invention resides in the provision of a spring loaded lost motion connection drive coupling a shoulder belt reel to a lap belt reel so that the main windup spring associated with the lap belt rotates the shoulder belt reel in the belt winding direction and yet the shoulder belt reel may be unwound against a lesser belt winding effort than the main windup spring acting on the lap belt reel while the lap belt reel remains stationary.

BRIEF DESCRIPTION OF THE DRAWINGS

These and other objects, features and advantages of the invention will become apparent upon consideration of the description of the preferred embodiment and the appended drawings in which:

FIG. 1 is a front elevation view of a retractor according to the invention and including a lap belt reel and a shoulder belt reel;

FIG. 2 is a sectional view taken in the direction of arrows 2—2 of the invention;

FIG. 3 is a sectional view taken in the direction of arrows 3—3 of FIG. 2 and showing the lost motion spring loaded drive coupling connecting the shoulder belt reel with the lap belt reel;

FIG. 4 is a sectional view taken in the direction of arrows 4—4 of FIG. 3;

FIG. 5 is a sectional view taken in the direction of arrows 5—5 of FIG. 3;

FIG. 6 is a sectional view taken in the direction of arrows 6—6 of FIG. 3; and

FIG. 7 is an exploded view of the lost motion spring loaded drive coupling.

DESCRIPTION OF THE PREFERRED EMBODIMENT

Referring to FIG. 1, there is shown a seat belt retractor 10 for a vehicle body and including a lap belt retractor generally indicated at 12 and a shoulder belt retractor generally indicated at 14. A frame 16 is provided for mounting the shoulder belt retractor 14 and lap belt retractor 12 on the vehicle body.

The lap belt retractor 12 includes a frame 18 having a base wall 20 mounted on the frame 16 and a pair of laterally spaced apart upstanding side walls 22 and 24. A lap belt reel 26 of retractor 10 includes an elongated belt drum 28 upon which the lap belt 30 is wound. Drum 28 extends between plates 32 and 34 on opposite sides of the belt 30. A reel shaft 38 is received by the belt drum 28 and suitably fixed to the plates 32 and 34 as by splining. The ends of the reel shaft 38 are rotatably supported within apertures in the side walls 22 and 24. The lap belt retractor 12 is preferably mounted at an inclined angle as shown in FIG. 1 so that the lap belt 30 unwinds about a forwardly inclined axis for optimum routing across the occupant lower torso.

The FIG. 1 right hand end of the reel shaft 38 extends outwardly through the adjacent side wall 24 and has a slot 42 which receives the inner end 44 of a spiral or clock main spring 46. The outer end 48 of the main spring 46 is attached to a plastic spring housing 50 which is in turn attached to the frame side wall 24. Accordingly, when the lap belt 30 is extended from the lap belt retractor 12, the reel 26 is rotated in the belt unwinding direction and the main spring 46 is wound up and energy is stored therein. The further the lap belt 30 is extended from the reel, the more windup energy is stored in the main spring 46 and the higher the windup effort urging rotation of the reel in the belt rewinding direction. Accordingly, when the belt is fully extended from the retractor and buckled about the occupant, a substantial spring effort is exerted on the belt to pull the belt taut against the seat occupant.

The FIG. 1 left hand end of the reel shaft 38 extends outwardly through the side wall 22 and has a toothed ratchet plate 54 attached thereto for engagement by a suitable locking mechanism, not shown, such as a pendulum actuated lock bar for locking the reel 26 against belt unwinding rotation. Such vehicle inertia sensitive locking mechanisms are well known in the seat belt art.

The shoulder belt retractor 14 includes a housing 60 including a base wall 62 attached to the frame 16 and pair of laterally spaced apart upstanding side walls 64 and 66. Shoulder belt reel 68 includes an elongated belt drum 70 on which the shoulder belt 72 is wound and which extends between plates 74 and 76 which are suitably fixed at opposite ends of the belt drum 70. An elongated reel shaft 80 is received by the belt drum 70 and suitably fixed to the plates 74 and 76 such as by splining. The ends of the reel shaft 80 are rotatably supported within apertures of the side walls 64 and 66. The FIG. 1 left hand end of the reel shaft 80 extends outwardly through the side wall 64 and has a toothed ratchet plate 86 attached thereto for engagement by a suitable locking mechanism, not shown, such as a pendulum actuated lock bar for locking the reel 68 against belt unwinding rotation. Such vehicle inertia sensitive locking mechanisms are well known in the seat belt art.

The FIG. 1 right hand end of the reel shaft 80 extends outwardly through the frame side wall 66 for connection with the reel shaft 38 of the lap belt retractor 12 by a coupling arrangement to be described hereinafter.

As best seen in FIGS. 3 and 7, a lost motion spring loaded drive coupling is provided for connecting the lap belt reel shaft 38 with the shoulder belt reel shaft 80. More particularly, the drive coupling, generally indicated at 90 includes a molded plastic base 92 having a central recess 94 which nonrotatably seats upon the left hand end of the lap belt reel shaft 38 for unitary rotation therewith. The base 92 has a circular recess 96 which rotatably receives a disc 98. As best seen in FIGS. 3, 6 and 7 the base 92 has an outer circumferential ball track 102 which extends approximately 315° around the base 92 and an inner circular ball track 104 which also extends approximately 315° around the base 92. Likewise, the opposing face of the disc 98 has an outer circular ball track 108 and an inner circular ball track 110 which face toward and are aligned with the ball tracks 102 and 104 of the base 92. As best seen in FIG. 3, a ball 112 is interposed between the disc 98 and base 92 and seats in the respective outer tracks 102 and 108 thereof. Likewise an inner ball 114 is captured between the base 92 and disc 98 and rides in their respective inner ball tracks 104 and 110. Upon relative rotation between the base 92 and the disc 98, the outer ball 112 and inner ball 114 roll in their respective ball tracks to enable approximately 630° of relative rotation between the base 92 and disc 98. At either end of that range of relative rotation the balls become engaged at the ends of the tracks as shown in FIGS. 5 and 6 and couple the base 92 and disc 98 for unitary rotation.

The drive coupling 90 also includes a spiral auxiliary spring 118 which has an inner end 120 seated in a slot 122 of the disc 98 and an outer end 124 which seats in a slot 126 provided in a cap 128 which is attached to the base 90 by a plurality of screws 130. The auxiliary spring 118 urges the disc 98 to its rotary position relative the base 92 as defined by the outer ball 112 and inner ball 114 being engaged at the ends of their respective outer and inner tracks.

As best seen in FIG. 1, the disc 98 is connected to the end of the shoulder belt reel shaft 80 by a universal joint assembly 138. The universal joint includes a yoke 140 which is suitably attached to the disc 98, a yoke 142 which is suitably attached to the end of shoulder belt reel shaft 80, and a cross member 144 including shaft 146 which rotatably seats in the spaced apart legs of the yoke 140 and cross bar 148 which rotatably seats within the spaced apart legs of the yoke 142.

The reactor of FIG. 1 is mounted on the floor of the vehicle body outboard the occupant seating position. The shoulder belt 72 passes upwardly along the vehicle pillar and slidably through a belt deflecting loop. The ends of the lap belt 30 and shoulder belt 72 are preferably connected together by a buckle element which is stored along the pillar when the lap belt 30 and shoulder belt 72 are fully wound and stored by the retractor 10. When the seat occupant wishes to deploy the belt system to the restraining position, the buckle is gripped and moved inwardly across the torso and engaged in a mating buckle element mounted on the vehicle body inboard the occupant seating position. As the belts are unwound from the retractor, the main spring 46 is wound up and energy is stored therein which acts upon the lap belt reel 26 to exert a belt winding effort thereon and pull the lap belt 30 taut against the occupant lower torso. At the same time, the shoulder belt 72 is taut against the occupant upper torso by the effort of the main spring 46 which is coupled to the shoulder belt reel shaft 80 by the drive coupling 90 and the universal joint assembly 138. More particularly, it will be understood that the balls 112 and 114 are seated at the ends of their respective outer and inner tracks as shown in FIGS. 5 and 6 so that the effort of the belt winding main spring 46 is coupled through to the shoulder belt reel 68.

If and when the seat occupant leans forward in the seat, for example to reach a vehicle control, the shoulder belt 72 is extended from the shoulder belt retractor 14. This unwinding rotation of the shoulder belt reel 68 is enabled by the lost motion connection provided between the disc 98 and base 92 by the balls 112 and 114 which roll along the outer ball track 102 and inner ball track 104 during relative rotation between disc 98 and base 92. During such shoulder belt unwinding rotation of the reel 68, the auxiliary spring 118 is wound up and energy is stored therein which urges belt winding rotation of the shoulder belt reel 68. The auxiliary spring 118 preferably has a substantially lesser winding effort than the main spring 46 so that the forward leaning movement of the occupant occurs against a lessened spring effort to enhance the comfort of the seat occupant.

When the seat belt buckle is unbuckled, the main spring 46 rotates the lap belt reel 26 in the lap belt winding direction and the drive coupling 90 simultaneously urges the rotation of the shoulder belt reel 68 in the belt winding direction.

It will be understood that the lost motion connection provided by the balls and tracks is only one example of a suitable lost motion connection which could be employed. For example, if it were desired to provide a larger range of relative rotation between the lap belt reel and shoulder belt reel, a single ball could be used which would ride in a spiraling track which could provide several rotations of the shoulder belt reel relative to the lap belt reel.

Furthermore, it will be understood that the relative lengths of the lap and shoulder belts and the relative size of the seat occupant will vary the relative extents of lap belt and shoulder belt unwinding at which the shoulder belt will be unwound to the extent at which the auxiliary spring 118 provides the winding bias. For example, it may be desirable to have the auxiliary spring effort acting on the shoulder belt at the normal seating position of the occupant so that the occupant comfort is enhanced when the occupant is normally seated against the seat back and to then have reached the limit of the lost motion between the shoulder belt and lap belt reel so that the relatively larger bias of the main spring is again imposed on the shoulder belt when the occupant leans substantially forward to reach vehicle controls so that the occupant will be reminded that he is positioned forwardly of the seat back.

Thus it is seen that the invention provides a new and improved seat belt retractor having a single main spring urging windup of both the lap belt and the shoulder belt and an auxiliary spring which is lost motion coupled between the shoulder belt reel and lap belt reel to permit shoulder belt unwinding against the lower winding effort of the auxiliary spring while the lap belt length remains the same.

The embodiments of the invention in which an exclusive property or privilege is claimed are defined as follows:

1. A retractor for winding and storing the ends of lap and shoulder belts having their other ends joined together by a buckle element by which the belts may be disposed in restraining positions respectively about the lower torso and upper torso of a seated vehicle occupant comprising:

a housing;

a lap belt reel rotatably mounted on the housing and having the lap belt end attached thereto; a shoulder belt reel rotatably mounted on the housing and having the shoulder belt end attached thereto;

a main spring acting between the housing and the lap belt reel to urge rotation of the lap belt reel in the direction to wind the lap belt taut about the occupant lower torso; and means coupling the shoulder belt reel with the lap belt reel so that the main spring urges rotation of the shoulder belt reel in the belt winding direction in unison with the lap belt reel, said coupling means also including an auxiliary spring interposed in the coupling relationship between the lap belt reel and the shoulder belt reel to enable unwinding rotation of the shoulder belt reel against the winding bias of the auxiliary spring and relative to the lap belt reel while the lap belt reel remains poised at its taut position about the stationary occupant lower torso.

2. The retractor of claim 1 further characterized by said auxiliary spring being of lesser spring effort than the main spring so that a relatively lower level of belt pressure is imposed on the occupant upper torso during shoulder belt unwinding within the defined range.

3. The retractor of claims 1 or 2 further characterized by said coupling means further including a lost motion connection therebetween to limit the range of unwinding motion of the shoulder belt reel relative to the lap belt reel so that occupant upper torso forward leaning movement beyond the range of lost motion is obtained against the winding bias of the main spring.

* * * * *